United States Patent [19]
Gordon et al.

[11] 3,715,685
[45] Feb. 6, 1973

[54] HIGH EFFICIENCY INJECTION LASER CAVITIES

[75] Inventors: Eugene Irving Gordon, Covent Station; Dan Maydan, Berkeley Heights, both of N.J.

[73] Assignee: Bell Telephone Laboratories, Incorporated, Murray Hill, N.J.

[22] Filed: April 30, 1971

[21] Appl. No.: 139,009

[52] U.S. Cl.............331/94.5 C, 350/174, 350/286, 356/113, 331/94.5 H
[51] Int. Cl.................................................H01s 3/00
[58] Field of Search.............331/94.5; 350/174, 286; 356/106 R, 2 R, 113

[56] References Cited

UNITED STATES PATENTS

| | | | |
|---|---|---|---|
| 3,433,568 | 3/1969 | Skalski et al. | 356/106 RL |
| 3,488,606 | 1/1970 | Rigrod | 331/94.5 B |
| 3,043,182 | 7/1962 | Saunders | 356/110 |
| 3,158,674 | 11/1964 | Woodson | 356/106 R |
| 3,332,314 | 7/1967 | Rosenthal | 356/106 LR |
| 3,471,799 | 10/1969 | Evtuhor | 331/94.5 |
| 3,482,186 | 12/1969 | Chernoch | 331/94.5 |
| 3,529,263 | 9/1970 | Simmons | 331/94.5 C |
| 3,590,248 | 6/1971 | Chatterton, Jr. | 250/199 |
| 3,602,725 | 8/1971 | De Maria | 307/88.3 |
| 3,611,181 | 10/1971 | Lary | 331/94.5 |

OTHER PUBLICATIONS

Lockwood et al. "An Efficient Large Optical Cavity Injection Laser," Applied Physics Letters, Vol. 17, p. 499–502, Dec. 1, 1970

Saunders: "The Koesters Interferometer," NBS Jour Res. vol. 58, Jan. 1957, pp 27–31

Saunders: "Construction of a Koesters Double-Image Prism," NBS Jour. Of Res. vol. 58, pp. 21–26, Jan. 1957

*Primary Examiner*—Ronald L. Wibert
*Assistant Examiner*—Edward S. Bauer
*Attorney*—R. J. Guenther and Arthur J. Torsiglieri

[57] ABSTRACT

The specification describes injection lasers employing heterosemiconductor structures for obtaining an enlarged cross-sectional area cavity defined by an optical waveguide terminated by the cleaved faces of the semi-conductor structure (usually known as mirrors). The enlarged area of the cavity allows higher power output from the laser for the same power density on the mirrors. The power density is limited by damage to the mirrors. The waveguide produces an output consisting of two plane wave lobes for each mode. Techniques for mode enhancement are described from which higher ultimate power for a single mode and higher efficiency can e predicted without exciting modes of other order. Separation between the thresholds of competing modes can be enhanced, for example, by placing a spherical reflector in the path of one output lobe to focus the energy back into the original cavity while at the same time aperturing the mirror to block modes of other order. This expedient is based upon the uniqueness of the lobe angle for a given mode. Also described is a technique for combining the dual lobe output characteristic of this laser structure by using a beam splitter in reverse.

12 Claims, 6 Drawing Figures

PATENTED FEB 6 1973

1 p-GaAlAs
2 p-GaAs
3 n-GaAs
4 n-GaAlAs

ENERGY GAP →   INDEX OF REFRACTION →

INVENTORS  E. I. GORDON
D. MAYDAN

BY

ATTORNEY

HIGH EFFICIENCY INJECTION LASER CAVITIES

BACKGROUND OF THE INVENTION

Field of the Invention

This invention relates to injection lasers and, specifically, to efficient heterostructure cavities for obtaining favorable power distribution.

The relatively recent use of heterojunctions has proven to be an important means of reducing threshold current in injection lasers based on GaAs. The lowest thresholds are associated with very narrow double heterostructures; however, the mirror damage resulting from pulsing such lasers at high levels well above threshold, where efficiency is high, is not well understood and, until the problem is resolved, it must be counted as a serious deficiency. It is sometimes assumed that the only practical means around the problem is to increase the thickness of the active region, thereby allowing a greater output power for a given power density. However, this increases the threshold current and may also allow many high-order modes to oscillate, thereby greatly decreasing the usefulness of the laser.

A cavity structure described recently by Lockwood et al in *Applied Physics Letters*, Vol. 17, No. 11, Dec. 1, 1970, offers a solution to the mirror damage problem. This cavity uses a heterostructure to provide an optical waveguide, and an active junction that has a large area cross section to reduce the power density. The specific structure described in a gallium arsenide injection laser with a relatively large N-region. Since the N-material has essentially the same refractive index as the compensated P-region but has low optical loss, this region simply expands the effective cross section of the cavity. The cavity is bounded by $Al_xGa_{(1-x)}As$, where $x$ is large enough to give a significant refractive index discontinuity at the boundary, thereby providing an optical waveguide. The waveguide fields consist of bouncing plane waves within the guide and bound surface waves at each interface.

A particularly important characteristic of the thick heterostructure laser is that the radiation pattern, of a given mode, corresponding to the bouncing plane waves emerging into free space beyond the mirror, contains two perfectly resolved radiation lobes, each one corresponding to a uniphase plane wave which has been apertured by the end mirror. In addition, there is a multiplicity of forward lobes associated with bound surface waves at the waveguide boundaries under conditions to be specified later. The energy in these lobes can be virtually completely suppressed. The highest order mode is favored, and the radiation pattern often corresponds to the simple bilobe. (Generally, the two main lobes of each of the lower order modes, if they were oscillating, would appear at smaller angles.)

This recognition is useful in connection with producing a uniphase output wave, but it does so only when a single higher mode is oscillating and then only at the expense of half the available power from the laser.

In speaking of the highest order mode, it should be understood that this refers to the highest order mode that can oscillate. Under certain conditions, the highest order waveguide mode allowed theoretically will not oscillate because excessive energy is associated with the bound surface wave as compared to the energy in the plane bouncing wave. Analysis of the behavior of the mode at the dielectric discontinuity to determine the effective reflectivity of the mode and calculation of the single pass gain indicates that, because of the unfavorable energy distribution, the threshold injection current for the mode is excessive. This same consideration also explains why the next highest order mode is the favored mode and is usually the one which oscillates. This observation is considered significant only to point out that the term "highest order mode" in the device under consideration is technically ambiguous and that this discussion concerns only modes which can be made to oscillate. Although they can be identified, the peculiar conditions under which the highest order theoretical mode will not oscillate are unimportant in delineating the invention.

According to one aspect of the invention, optical means are provided for combining the two coherent output lobes of a given mode into one lobe. This result can be achieved in general by using a beam splitter in reverse. An especially effective and simple structure useful in this way is a Kösters prism.

Another approach to achieving the same result is to place a spherical mirror in the path of one beam and spaced from the exit mirror a distance equal to its radius of curvature, or twice its focal length when considered as a lens. This focuses the energy of that lobe back into the cavity. Most of this energy appears ultimately in the other lobe. This approach has special merit in that it leads to convenient methods for guaranteeing the modal purity of the output beam. Selectivity can result from promoting a greater separation between the lasing injection current threshold for the desired mode with respect to a competing mode. This is realizable because the radiation angle increases monotonically with M, the mode number. Thus, in the far field, the mode patterns only partially overlap spatially. The useful consequence of this recognition is that the laser threshold for all unwanted modes can be increased dramatically by aperturing the mirror at or near the position of incidence of the unwanted mode beams and ensuring that the mirror is in the far field. The far field distance can be defined for the purposes of this discussion as:

$$R >> D^2\cos\phi/\lambda_0$$

where $R$ is the separation between the plane mirror of the original cavity and the spherical mirror (equal to the radius of curvature of the spherical mirror), $D$ is the width of the cavity, $\phi$ is the angle of issuance of the highest order mode of interest measured from the mirror normal and $\lambda_0$ is the free space wavelength of the radiation.

The aperture can be incorporated into the mirror or, for versatility or ease of adjustment, it may be a separate element. In the latter case, the aperture element should be located very near the mirror to avoid edge diffraction.

Additional discrimination can be obtained by applying an antireflection coating on the plane mirror interface between the cavity and the spherical mirror. This will decrease the effective reflection coefficient for the apertured modes with respect to the selected mode. It will become evident that the aperturing effect can be multiplied by locating apertured reflectors in the path of other lobes.

These and other aspects of the invention will be treated more specifically in the following detailed description. In the drawing.

Figure 1:
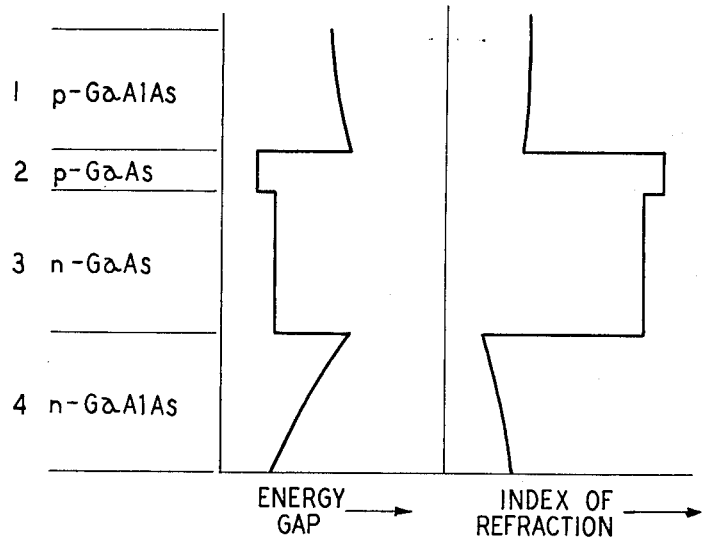
FIG. 1 is a schematic diagram of a heterostructure useful for the invention comparing the energy gap and the index of refraction with the cross section of the structure.

Consider the structure as shown in FIG. 1. The region between the P-type of GaAlAs and P-type GaAs interface, (region 1), and the PN junction in the thick GaAs region, (region 3), exhibits gain for a wavelength range characteristic of the bandgap of region 2. Region 3 has only slight loss because its bandgap is slightly greater, and regions 1 and 2 have very low loss. There is a decrease in index of refraction at the transition from region 2 to 1 and region 3 to 4 of order a few percent. Thus, for example, all plane waves propagating into these two interfaces from within regions 2 and 3 with an angle of incidence greater than the critical angle defined by the index change will be trapped between the two interfaces. If regions 2 and 3 have an index of refraction $n$ ($n = 3.6$ for GaAs) and regions 1 and 4 have an index of refraction $n-\Delta n$, then the critical angle $\Theta_c$ is defined by:

$$\Theta_c = \sin^{-1}(1-\Delta n/n).$$

(It is assumed that the laser is constructed with the customary striped electrode configuration or has other means for limiting the transverse modes in the junction plane to low-order modes so that the discussion can be concerned only with the spatial and angular distribution of the modes in a direction perpendicular to the junction plane. See, e.g., U.S. Pat. No. 3,363,195 issued Jan. 9, 1968.) These plane waves make up a finite set of propagating low-loss, waveguide modes. The fields outside the waveguide in regions 1 and 4 correspond to bound surface waves. The energy stored in these fields is negligible compared to the energy within the guide for all modes but the very highest order mode if $$(2n\Delta n - (\Delta n)^2)^{1/2} >> \lambda_0/2D.$$

The plane waves associated with the lowest order mode propagate at close to grazing incidence with no zero in the electric field distribution within the guide. The highest order confined mode corresponds to plane waves with the smallest angle of incidence appropriate to the boundary conditions but greater than the critical angle associated with the index mismatch. The number of zeros in the field distribution depend on the overall thickness of regions 2 and 3. The mode number $M$ equals the number of zero crossings. For purposes of definition, it is appropriate if the index mismatch $\Delta n \geq 0.01$ and $D >> \lambda_0$. This satisfies the requirement that negligible energy is stored in bound surface wave.

Figure 2A:
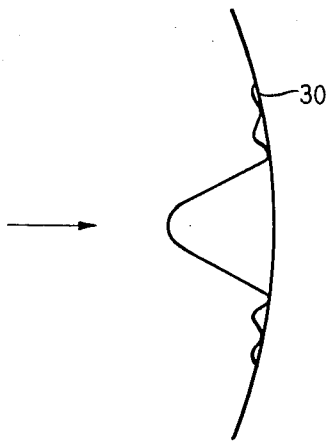
FIGS. 2A and 2B represent spatial distributions of photon flux from various oscillating modes on a spherical external mirror.
Figure 2B:
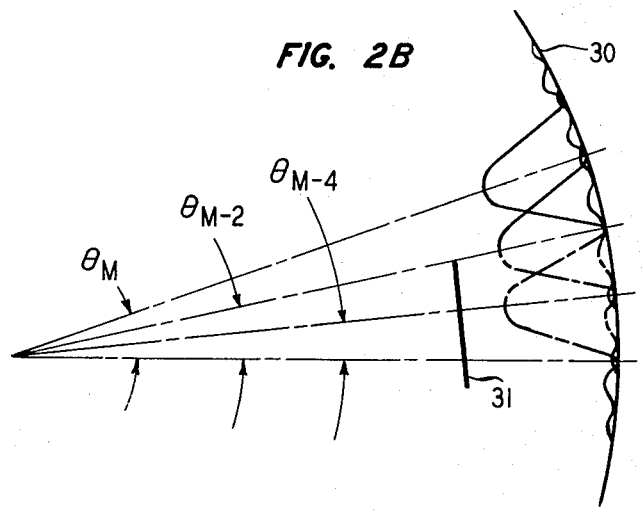

The resolvability of the competing high order modes in terms of their field radiation pattern is illustrated schematically in FIGS. 2A and 2B. FIG. 2A is a representation of the spatial photon flux distribution incident on a curved surface at infinity. Due to the angular separation between the different modes supported by the cavity as described above, the flux pattern across a spherical reflector 30, placed in the refracted path of one or both lobes exiting from the cavity, will appear qualitatively as in FIG. 2B. Three high-order modes are shown corresponding to M, M-2, and M-4. The highest order mode is that having an angle nearest the critical angle of the laser cavity waveguide. The forward lobes associated with the bound surface waves has not been shown since the waveguide geometry has been chosen to make their relative energy content negligible. The flux pattern for each mode separately is shown as if there were equal power in each mode (the composite pattern would, of course, show only three barely resolved maxima in the power distribution). This illustration is useful in showing that an aperture 31 placed as shown will eliminate virtually all of the M-4 mode and half of the M-2 mode, without significantly impairing the reflectivity of the mode M. The effect of aperturing half the power from mode M-2 is to effectively eliminate this mode as well. It can be shown that the effective mirror reflectivity for this mode is actually 25 percent of the value for mode M. In fact, a reduction in reflectivity of a few percent is normally sufficient to extinguish a competing mode when the laser is operated near threshold. The implication of reducing the reflectivity of the competing modes so far beyond the apparent point of extinction is that it allows the main mode to be operated well above threshold corresponding to high-power levels and high efficiency without allowing other modes to oscillate. Thus it can be appreciated that, if the threshold of the M-1 mode can be increased by a significant value, say 50 percent, through the use of the aperture, then the laser output from the main mode can be increased significantly before the M-1 mode oscillates.

Near threshold, the power is limited to a single transverse mode and this is a vital quality. Each of the lobes separately has the characteristics of a single uniphase wave since they originate from a plane wave. At the expense of half the available power, one has the ideal mode with no further effort. However, there are a variety of optical structures which can combine the two coherent lobes into one.

Figure 3:
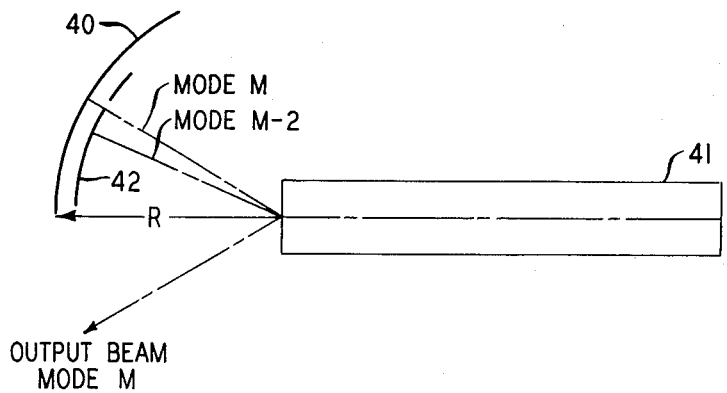
FIG. 3 is a schematic representation of an injection laser associated with an apertured reflector in accordance with the invention.

A direct approach is to refocus one of the lobes back into the cavity. This can be done simply as shown in FIG. 3 with a spherical mirror 40 of radius curvature R spaced a distance R measured along one beam from the output face of the laser 41. This arrangement focuses the near field back on itself. For an oscillating laser, achievement of the necessary alignment is very straightforward.

The effective mirror reflectivity for one beam is close to 100 percent. This reduces the required threshold gain for the highest order mode. Since all of the modes are aligned simultaneously, the threshold gain is similarly reduced for all of the modes.

Figure 4:
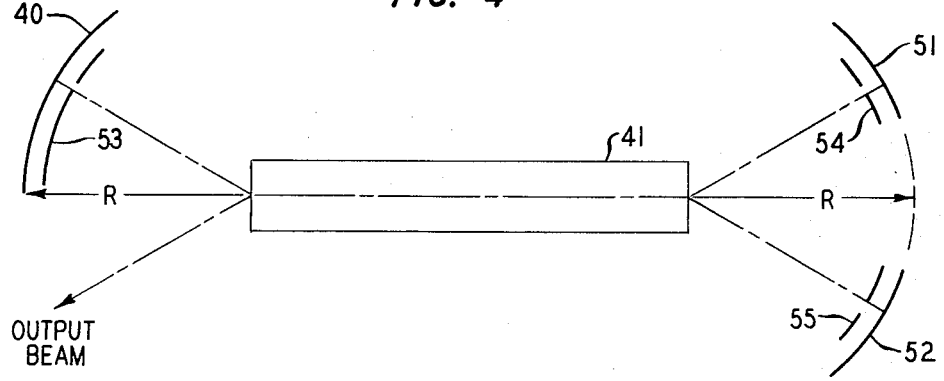
FIG. 4 is a schematic representation similar to FIG. 3 but with additional reflectors.

As shown above, the radiation pattern for each of the modes is not coincident so that aperturing of all modes but one is easily realizable. The distance R must be chosen to be in the far field of the lobe (as previously defined) and the aperture 42 must be placed close to the plane or the mirror. For even greater discrimination, the arrangement of FIG. 4 can be utilized in which all but the output lobe are selectively reflected, using additional spherical reflectors 51 and 52 and apertures 53, 54, and 55. In this arrangement, both plane mirrors are partially transparent.

As an example of the selectivity provided by an aperture, we consider the case of a slit of normalized width Z (normalized such that $Z = 2\pi$ when the slit edges fall at the first zeros of the diffraction pattern) centered on the wanted mode. The adjacent unwanted modes are displaced by $\pm\pi/2$ or ¼ of the zero-to-zero spacing. The reflectivity for the wanted mode is given by $R_M$ and for the adjacent unwanted modes by $R_{M \pm 1}$. These values are tabulated in Table I and illustrate, for example, that with a slit of width $12\pi/8$, the wanted mode reflectivity is 78.8 percent, while the unwanted mode reflectivity is 46.7 percent. For wider slits, the wanted mode reflectivity increases, but the selectivity is lost. The selectivity is enhanced for narrower slits, but the absolute reflectivity decreases. When it falls below the Fresnel reflectivity of the end mirror, the effectiveness of the scheme is greatly diminished. It is evident that the enclosed values in Table I represent preferred aperture sizes.

TABLE I

| Slit Width Z | $R_M$ | $R_{M\,1}$ |
|---|---|---|
| 0 | 0 | 0 |
| 1/8 π | 0.0154 | 0.00255 |
| 2/8 π | 0.0607 | 0.01035 |
| 3/8 π | 0.1315 | 0.0242 |
| 4/8 π | 0.218 | 0.0444 |
| 5/8 π | 0.318 | 0.0710 |
| 6/8 π | 0.420 | 0.1065 |
| 7/8 π | 0.512 | 0.151 |
| π | 0.592 | 0.204 |
| 10/8 π | 0.725 | 0.331 |
| 12/8 π | 0.788 | 0.467 |
| 14/8 π | 0.810 | 0.613 |
| 2 π | 0.812 | 0.722 |
| 3 π | 0.868 | |

It seems, therefore, that though the far field radiation patterns of adjacent order lobes are not well resolved, they are sufficiently separated that significant feedback enhancement of a given wanted mode is available.

The foregoing methods for mode enhancement are not necessarily directed toward enhancing the highest order mode. The choice of which mode to enhance is based upon at least three criteria. The forward lobes are not completely suppressed in the highest order to modes so an intermediate mode is more desirable. The electric field distribution for an intermediate mode does not have its field distribution maximum at the waveguide boundary, but rather slightly inside and the field variation is sufficiently slow that a field maxima can be maintained over virtually the full width of the gain region. This allows a large single pass gain and some discrimination against lower order modes. A minimum in reflectivity of the mirrors can be arranged for larger angles to further discriminate against higher order modes.

With regard to the second of these, i.e., the spatial distribution of the field within the cavity, the efficiency of the cavity can be optimized in terms of the following relationship:

$$M \cong D/4d_2$$

where $M$ is the mode number (number of zero crossings) being enhanced, $D$ is the overall cavity thickness and $d_2$ is the thickness of the gain region. A simple mode diagram will show by inspection that this relationship assures a large filling factor of the active region for energy in the desired mode (this assumes that the active layer is a boundary layer of the cavity).

An alternative to the use of spherical reflectors for deriving a single output beam is to place a beam splitter, operating in reverse, in the path of both beams. This expedient seems very straightforward, but because the laser output beams are widely diverging and a beam splitter is normally thought of as having a single, allowably small, input aperture, its adaptability for this application is apparently a new recognition.

Figure 5:
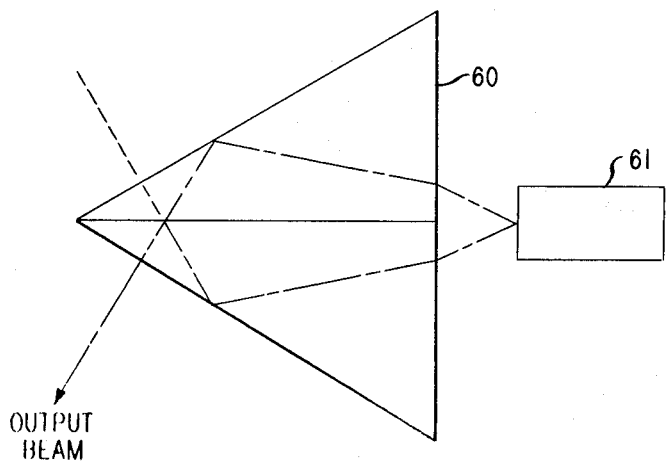
FIG. 5 is a schematic diagram of an injection laser with dual output lobes optically coupled to a beam combiner for deriving a single optical output.

A convenient device for combining the two lobes is shown in FIG. 5. The prism 60, a Kösters prism, is placed as shown with both output beams from the laser 61 incident symmetrically on one face.

The distance from the prism to the laser output mirror is not important since the two paths are symmetrical. The two beams will overlap automatically so long as the normal to the mirrors of the laser is in precisely the plane of the beam splitter and approximately perpendicular to the base. Thus the laser need only be tilted to achieve overlap. The tilt range is of order 3°, about equal to the diffraction angle of the lobe. Phase matching at the beam splitter to eliminate the reflected wave is achieved by translating the laser in a direction perpendicular to the beam splitter. The reflected wave will go from a maximum to a minimum in a distance of $D/M \sim 1$ micron. The lowest minimum value will be achieved when the beam splitter plane is coincident with the plane in the cavity at ½ D. When these adjustments are correct, virtually all of the energy in the two lobes is brought stably into spatial and temporal coherence in the output beam.

Various additional modifications and extension of this invention will become apparent to those skilled in the art. All such variations and deviations which basically rely on the teachings through which this invention has advanced the art are properly considered within the spirit and scope of this invention.

What is claimed is:

1. An injection laser comprising:
    an active laser element;
    an optical waveguide enclosing said active element for confining the radiation generated in the active element;
    said laser element and said waveguide cooperating to produce a dual lobe divergent beam output in which the paths of the dual beams are symmetrical and acute with respect to the plane of the output reflector and in which each lobe is a uniphase, plane wave; and
    an optical beam combiner for combining the divergent beams from the laser into a single uniphase plane wave so that virtually all of the energy in the two lobes is brought stably into spatial and temporal coherence in the output beam.

2. The injection laser of claim 1 in which the optical beam combiner is a Kösters prism.

3. An injection laser comprising:
- an active laser element including a longitudinal cavity terminated at one end with an output reflector;
- an optical waveguide enclosing said active element for confining the radiation generated in the active element;
- said laser and waveguide cooperating to produce a dual lobe output in which the paths of the dual beams are symmetrical and acute with respect to the plane of the output deflector and in which each lobe is a uniphase, plane wave; and
- means for combining the dual lobes into a single uniphase output wave, said means comprising at least one spherical mirror disposed externally of the injection laser cavity in the far field to intersect one of the output lobes and spaced with the center of its curvature coincident with the output reflector of the injection laser so that radiation exiting in said one lobe from the cavity is efficiently reflected back into the cavity to enhance the intensity of the high order mode in the other lobe.

4. The laser of claim 3 further including means for aperturing the beam incident on the spherical mirror to eliminate unwanted modes from the injection laser.

5. The laser of claim 4 in which the aperture width lies in the range of three-eighths to three-fourths the width of the lobe measured from first zero to first zero on either side of the main peak.

6. The laser of claim 4 in which the aperture is part of the reflector.

7. The laser of claim 4 in which the longitudinal cavity terminates at both ends with partially transparent reflectors and three apertured spherical reflectors are situated similarly to the aforesaid aperture means with respect to three output lobes from the injection laser cavity.

8. The laser of claim 4 in which the exit mirror of the longitudinal cavity is provided with an antireflection coating.

9. The laser of claim 4 in which the laser element and the optical waveguide comprise a heterosemiconductor structure.

10. The laser of claim 9 in which the heterosemiconductor comprises $Al_xGa_{(1-x)}As:GaAs:GaAs:Al_xGa_{(1-x)}As$ where $x$ in each case is sufficient to impart a significant refractive index discontinuity at the heterosemiconductor interface.

11. The laser of claim 10 in which the refractive index discontinuity is at least 0.01.

12. The laser of claim 4 in which the mode M centered within the aperture is chosen such that:

$$M \cong D/4d_2$$

where $D$ is the overall width of the cavity, and $d_2$ is the width of the gain region.

* * * * *